United States Patent
Sedarat et al.

(10) Patent No.: US 9,742,465 B1
(45) Date of Patent: Aug. 22, 2017

(54) NBASE-T PHY-TO-PHY INFORMATION EXCHANGE METHOD AND APPARATUS

(71) Applicant: Aquantia Corporation, San Jose, CA (US)

(72) Inventors: Hossein Sedarat, San Jose, CA (US); Dragan Labalo, San Jose, CA (US)

(73) Assignee: Aquantia Corp., Milpitas, CA (US)

( * ) Notice: Subject to any disclaimer, the term of this patent is extended or adjusted under 35 U.S.C. 154(b) by 0 days.

(21) Appl. No.: 14/961,797

(22) Filed: Dec. 7, 2015

Related U.S. Application Data

(60) Provisional application No. 62/088,524, filed on Dec. 5, 2014.

(51) Int. Cl.
| | |
|---|---|
| *H04B 3/00* | (2006.01) |
| *H04L 25/00* | (2006.01) |
| *H04B 3/32* | (2006.01) |
| *H04B 3/487* | (2015.01) |

(52) U.S. Cl.
CPC ............... *H04B 3/32* (2013.01); *H04B 3/487* (2015.01)

(58) Field of Classification Search
CPC ........ H04B 3/32; H04B 3/487; H04B 7/0615; H04L 1/0003; H04L 5/1438
USPC ....... 375/219, 220, 222, 295, 346, 257, 258; 370/445, 484
See application file for complete search history.

(56) References Cited

U.S. PATENT DOCUMENTS

| | | | |
|---|---|---|---|
| 6,057,743 A | 5/2000 | Aekins | |
| 6,160,790 A | 12/2000 | Bremer | |
| 6,201,796 B1 | 3/2001 | Agazzi et al. | |
| 6,208,671 B1 | 3/2001 | Paulos et al. | |
| 6,219,378 B1* | 4/2001 | Wu | H04L 5/1438 370/484 |
| 7,177,283 B2 | 2/2007 | Fukae et al. | |
| 7,236,463 B2 | 6/2007 | Lai | |
| 7,346,012 B2 | 3/2008 | Stopler | |
| 7,701,867 B2 | 4/2010 | Bui | |
| 7,720,075 B2 | 5/2010 | Costo | |
| 7,881,322 B1 | 2/2011 | Benveniste | |
| 7,983,289 B2 | 7/2011 | Yamanaka et al. | |
| 8,271,807 B2 | 9/2012 | Jackson | |
| 8,274,894 B2 | 9/2012 | Kneckt et al. | |
| 8,320,411 B1 | 11/2012 | Sedarat et al. | |
| 8,335,937 B2 | 12/2012 | Qi et al. | |
| 8,659,986 B1 | 2/2014 | Martinson et al. | |
| 2001/0055311 A1* | 12/2001 | Trachewsky | H04L 1/0003 370/445 |
| 2005/0042931 A1 | 2/2005 | Lavie | |
| 2007/0064151 A1 | 3/2007 | Chang et al. | |
| 2007/0076722 A1 | 4/2007 | Ungerboeck | |
| 2007/0248024 A1 | 10/2007 | Conway et al. | |

(Continued)

FOREIGN PATENT DOCUMENTS

WO    WO 2011/056970 A2    5/2011

*Primary Examiner* — Phuong Phu

(74) *Attorney, Agent, or Firm* — Lance Kreisman; Peninsula Patent Group

(57) ABSTRACT

A method of operation in an Ethernet transceiver is disclosed. The method includes initiating a training mode of operation, and transmitting Infofield frames to a link partner. Each Infofield frame including a payload field to provide data to the link partner. A flow of the transmitted Infofield frames is controlled such that a new Infofield frame is not transmitted before a previous Infofield frame is received by the link partner.

17 Claims, 4 Drawing Sheets

(56) References Cited

U.S. PATENT DOCUMENTS

| | | |
|---|---|---|
| 2008/0089433 A1* | 4/2008 | Cho .................... H04B 7/0615 375/267 |
| 2011/0249686 A1 | 10/2011 | Langner |
| 2011/0286391 A1 | 11/2011 | Chen et al. |
| 2011/0292977 A1 | 12/2011 | Farjadrad |
| 2012/0051240 A1 | 3/2012 | Dwivedi et al. |
| 2012/0195227 A1 | 8/2012 | Vedantham et al. |
| 2014/0258813 A1 | 9/2014 | Lusted |

* cited by examiner

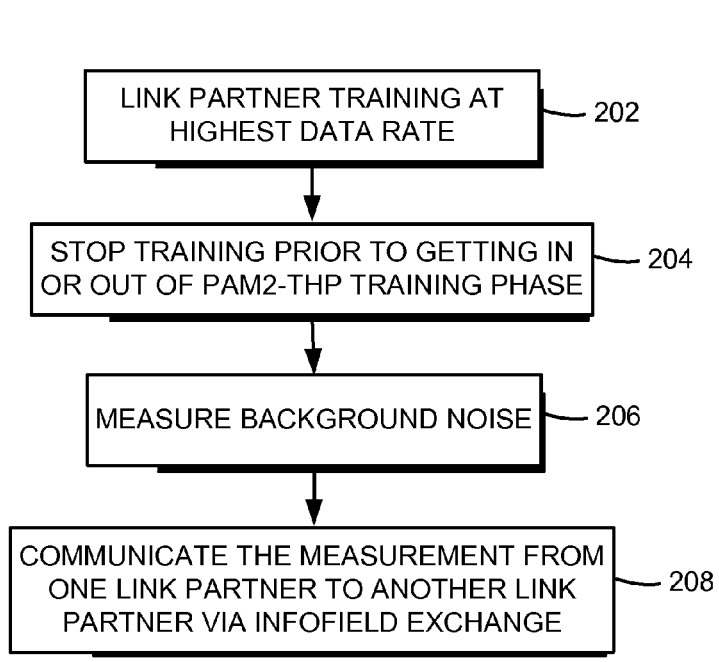
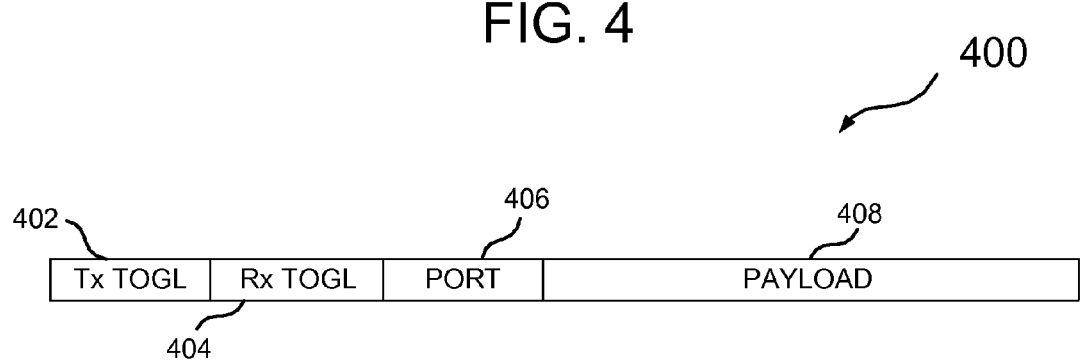

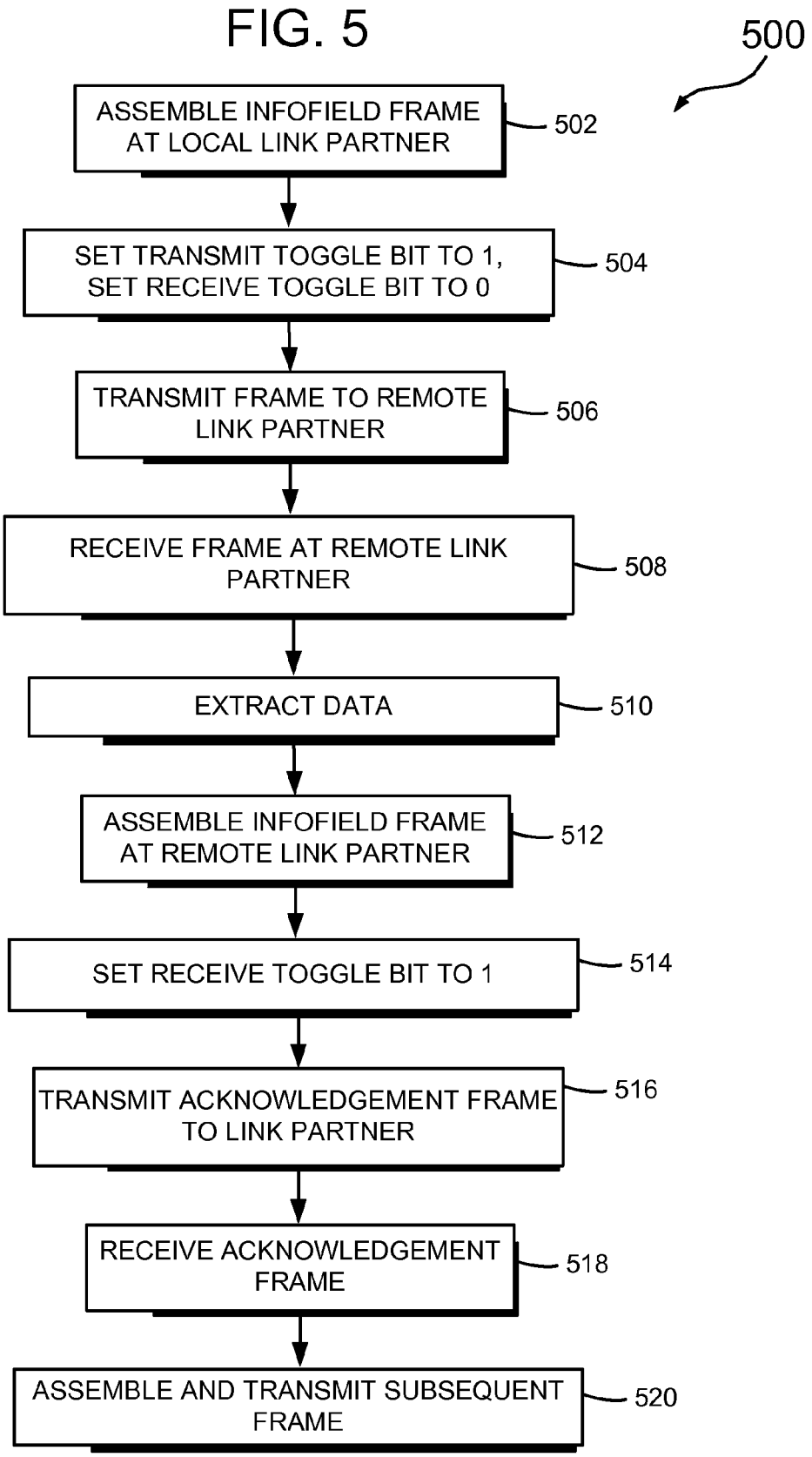

NBASE-T PHY-TO-PHY INFORMATION EXCHANGE METHOD AND APPARATUS

CROSS-REFERENCE TO RELATED APPLICATIONS

This application is a Non-Provisional that claims priority to U.S. Provisional Application No. 62/088,524, filed Dec. 5, 2014, entitled ALIEN CROSSTALK CHARACTERIZATION AND DIAGNOSTICS, which is incorporated herein by reference in its entirety.

TECHNICAL FIELD

The disclosure herein relates to communications systems, and more specifically to high-speed Ethernet systems and methods.

BACKGROUND

Much of today's modern Ethernet infrastructure is based on twisted pair copper cables that meet certain specifications. One common "category" of Ethernet cable is identified as CAT5e, which is rated for data rates up to 1 Gbps. Recently, however, proposals have been made to use the existing Ethernet infrastructure in the enterprise environment for data rates above 1 Gbps and up to 5 Gbps and beyond. Using cabling such as CAT5e at higher rates poses challenges, especially when affected by alien crosstalk.

In order to operate at such high data rates in relatively noisy environments, training sequences are often employed to characterize Ethernet link parameters and ensure that the link partners can transmit and receive data at the specified high data rates. Information may be exchanged between the link partners before the link can go online through an Infofield protocol that is utilized during a training mode of operation. The exchange protocol is typically disabled once the specified training sequence is complete.

In some situations, it would be desirable to exchange information, such as alien crosstalk information, between link partners following completion of the training mode of operation, but before the link can go online for high-speed data transfers.

BRIEF DESCRIPTION OF THE DRAWINGS

Embodiments of the disclosure are illustrated by way of example, and not by way of limitation, in the figures of the accompanying drawings and in which like reference numerals refer to similar elements and in which:

FIG. 2 illustrates a flowchart of steps for one embodiment of a method for characterizing alien crosstalk between a victim link and an aggressor link.

FIG. 4 illustrates one embodiment of an Infofield frame data structure for use with the resources of FIG. 3.

FIG. 5 illustrates a flowchart of steps for one embodiment of a method for exchanging information between local and remote link partners utilizing an Infofield exchange protocol.

DETAILED DESCRIPTION

Methods and apparatus for exchanging information between Ethernet transceivers are disclosed. In one embodiment, a method of operation in an Ethernet transceiver is disclosed. The method includes initiating a training mode of operation, and transmitting Infofield frames to a link partner. Each Infofield frame including a payload field to provide data to the link partner. A flow of the transmitted Infofield frames is controlled such that a new Infofield frame is not transmitted before a previous Infofield frame is received by the link partner. The flow control mechanism enhances the robustness of the data transfer.

Figure 1:
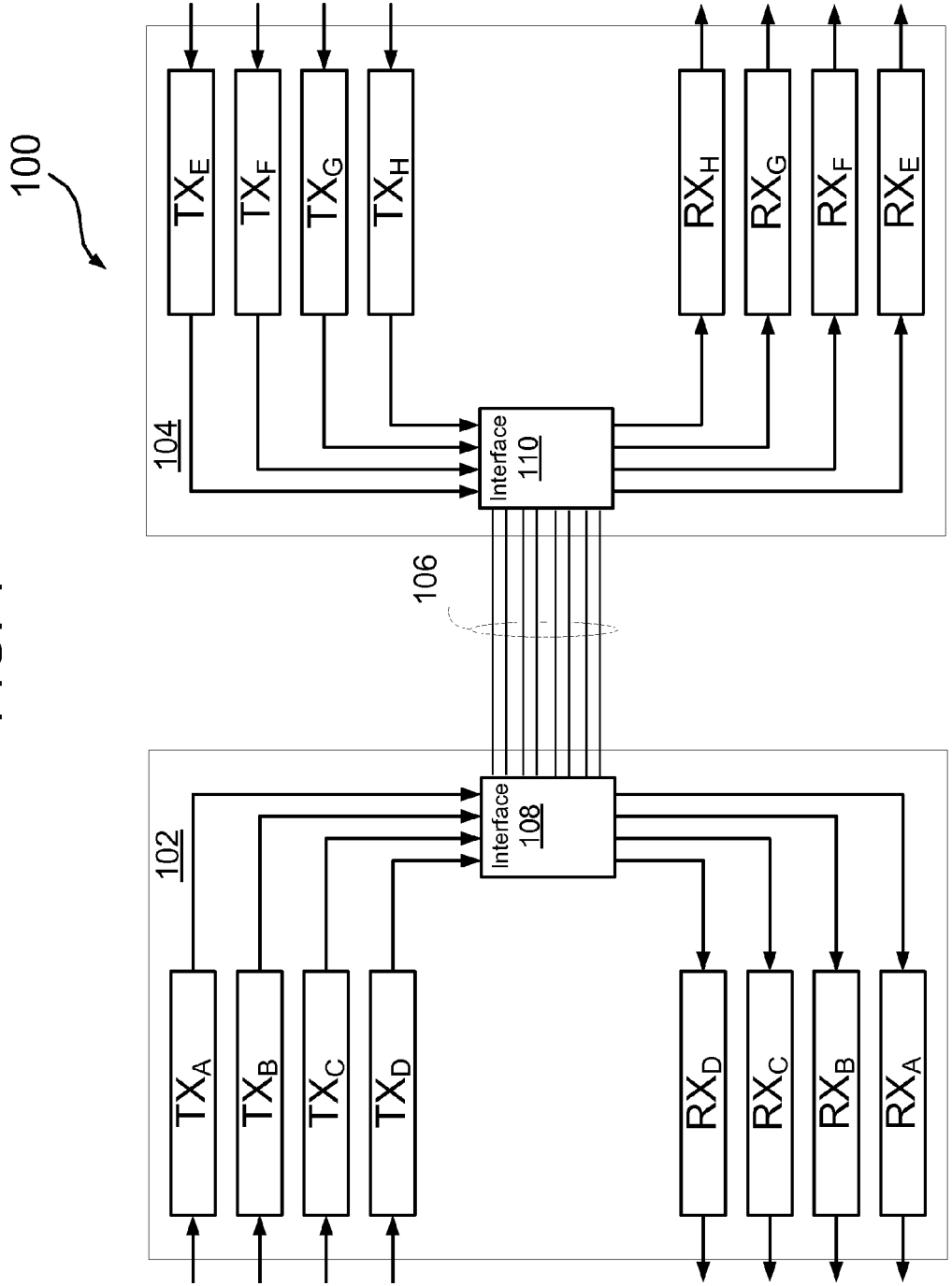
FIG. 1 illustrates a high-level transmitter/receiver (transceiver) channel architecture for an NBASE-T Ethernet transceiver.

FIG. 1 is a block diagram illustrating one embodiment of a communication system 100. The system includes a first transceiver integrated circuit (IC) or chip 102 and a second transceiver chip 104 that can communicate with each other. The first transceiver 102 includes "transceiver components" including one or more transmitters $TX_A$-$TX_D$ and one or more receivers $RX_A$-$RX_D$. Similarly, the second transceiver 104 includes various transceiver components including one or more transmitters $TX_E$-$TX_H$ and one or more receivers $RX_E$-$RX_H$. The transmitters $TX_A$-$TX_H$ shown in FIG. 1 can be considered individual "transmitters," as typically referenced herein, or can be considered individual transmitter channels which a transmitter block within the transceiver can independently transmit signals on. Similarly, receivers $RX_A$-$RX_H$ can be considered individual "receivers," as typically referenced herein, or can alternately be considered individual receiver channels which a receiver block within the transceiver can independently receive signals on. The transmitters and receivers are connected to one or more components (not shown) of a computer system, device, processor, or other "controller" associated with each respective transceiver which wants to communicate data over the communication network. For example, the transmitters receive data and control signals from the controller connected to the first transceiver 102 in order to send the data over the network to other transceivers and controllers, while the receivers receive data from other transceivers and controllers via the network in order to provide the data to the controller connected to the first transceiver 102.

The first transceiver chip 102 can communicate with the second transceiver chip 104 over one or more communication channels of a communication link 106. In one embodiment, such as one similar to the 10GBASE-T Ethernet standard, four communication channels are provided on the communication link 106, each channel including a twisted pair cable. Thus, in that standard, there are four transmitters TX and four corresponding receivers RX provided in each of the transceivers 102 and 104, each transmitter associated with one of the local near-end receivers in the same transceiver, and each such transmitter/receiver pair dedicated to one channel used for duplex communication. A transmitter/receiver pair in the first transceiver 102 communicates across a channel of the link 106 to a far-end transmitter/receiver pair in the second transceiver 104. A transmitter TX and a receiver RX that are connected to the same channel/link, or two transceivers connected by the communication link 106, are considered "link partners."

An interface 108 can be provided in the first transceiver chip 102 and an interface 110 can be provided in the second transceiver chip 104 to allow data transmissions between the transceivers to be routed to the appropriate transceiver blocks. For example, the interfaces 108 and 110 can include transformers, and circuitry used for directing signals or data (alternatively, some or all circuitry can be included in other components, such as transmitters TX and receivers RX).

In one example, from the point of view of the first transceiver chip 102, data transmissions during a normal or regular operation mode from a local transmitter TX are provided to the interface 108, which outputs the data on a corresponding channel of the communication link 106. The data is received by the link partner, the second transceiver chip 104. The interface 110 of the transceiver 104 provides the received data to its receiver RX connected to that same channel. Furthermore, due to noise effects such as near-end crosstalk and echo, the data transmitted by the transmitters is also received by the near-end receivers in the same transceiver. Echo and crosstalk filters may be used to filter out this noise so that the receivers receive only data from other transceivers. In virtually all real scenarios, the data transmitted by a local transmitter has no dependence or relation with data being received by the corresponding local receiver.

In many instances, enterprise applications that employ the channel architecture of FIG. 1 utilize thousands of such deployments, resulting in complex crosstalk environments. Before a given link can be placed into service at a high data rate, though, it often goes through a sequence of training steps. However, standardized conventional training steps typically fail to take into account the effects of alien crosstalk. Moreover, once the standardized training routines are completed, little to no communication between the link partners is generally provided for, until the link comes up to full operation.

Referring now to FIG. 2, one embodiment of a method for characterizing alien crosstalk, generally designated 200, provides a mode of operation in an Ethernet transceiver that can characterize alien crosstalk from any aggressor link to a particular victim link in an enterprise environment. At 202, link partners associated with the victim link and the aggressor link initiate a training process at the highest data rate possible. For some embodiments, such as those where the link partners meet 10GBASE-T standards, the highest data rate may be 10 Gbps. Other data rates are possible in other embodiments, such as from between 500 Mbps to 10 Gbps. Ethernet links that provide selectable data rates are referred to herein as "NBASE-T" links.

Further referring to FIG. 2, the training process may eventually include a PAM2-THP training phase. Prior to entering or exiting the PAM2-THP training phase, a coordinated Infofield exchange is carried out to stop the training process, at 204. At this point, the link partners may measure background noise characteristics, at 206. The background noise shows the effect of alien crosstalk and other sources of noise and disturbance. For some embodiments, the measurement may result in a single value indicating the entire power of the measured noise, or across frequency as a value indicating the power spectral density (PSD) of the noise. Other embodiments may utilize adaptive filters on the transceiver chips to generate an impulse response that characterizes an alien crosstalk channel. Various methods and apparatus for carrying this out are described in copending U.S. patent application Ser. No. 14/961,802, titled "On-Chip Alien Crosstalk Characterization and Diagnostics", filed Dec. 7, 2015, assigned to the assignee of the present application, and expressly incorporated by reference herein. Following the noise measurement, the value or tap coefficients corresponding to the impulse response, may be communicated from one link partner to the other through another protocol or data exchange method such as through an Infofield exchange, at 208.

For some embodiments, the noise measurement can be performed while other crosstalking links are actively operating. In such cases, the background noise measurement on the link partners of a victim link identifies the overall crosstalk noise contributed from all other links in the network. This information may be used by an application software to limit the data rate on the victim link. One embodiment of a global characterization apparatus and method for characterizing a network is described in U.S. patent application Ser. No. 14/961,806, titled "Network Switch Apparatus and Methods For Global Alien Crosstalk Characterization and Diagnostics", filed Dec. 7, 2015, assigned to the assignee of the instant application, and expressly incorporated herein by reference.

Figure 3:
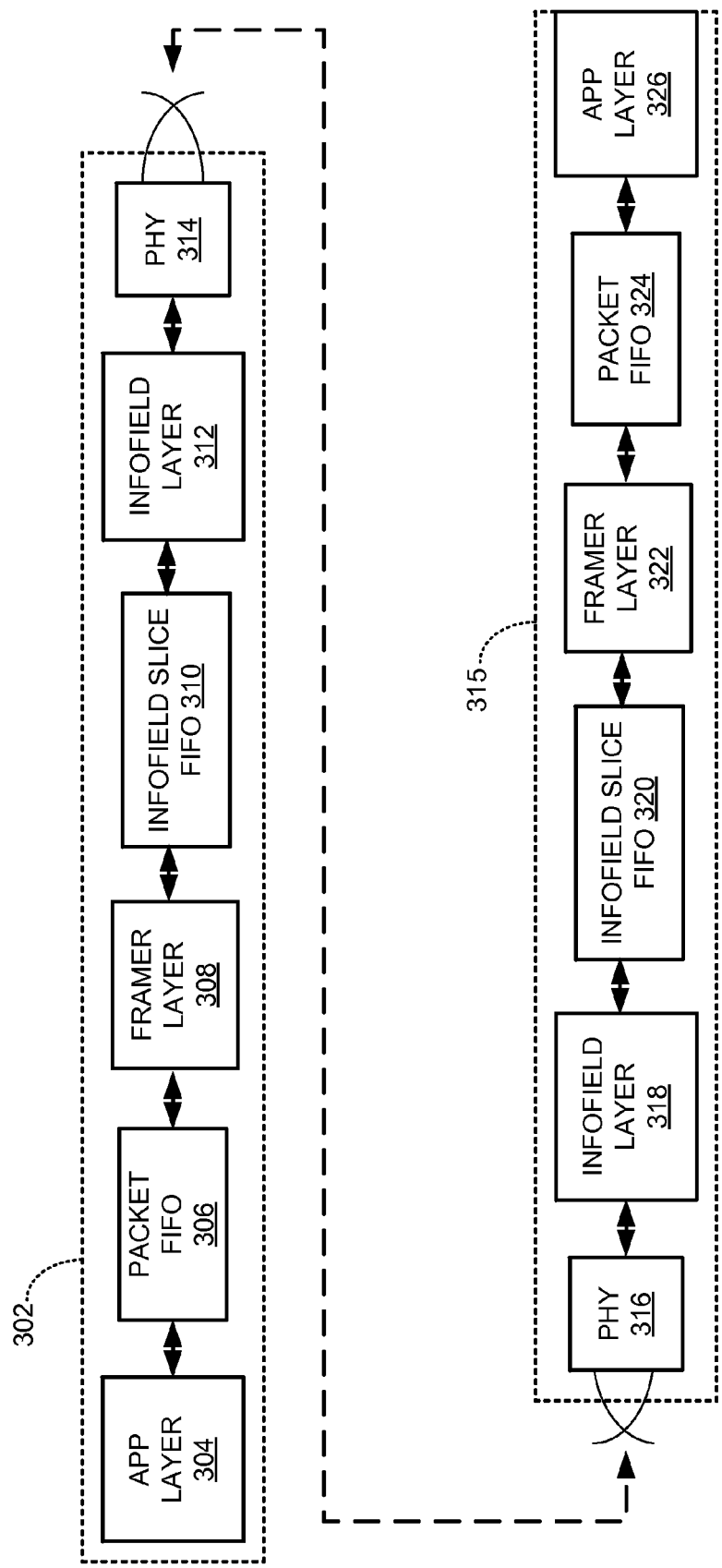
FIG. 3 illustrates one embodiment of the software and hardware resources allocated to respective local and remote link partners to carry out an Infofield exchange.

Generally, Infofield frames may be used for exchanging parameters and control information between the link partners. One embodiment of an information exchange flow that may utilize Infofield exchange machinery is shown in FIG. 3, and generally designated 300. The resources include software/hardware resources organized into "layers." The hardware and software resources associated with a first link partner 302 include an application layer 304 that interfaces with a packet first-in-first-out (FIFO) circuit 306. The application layer 304 may include one or more functions that request management data input/output (MDIO) read or write operations to a remote end of the link. From a transmission perspective, the application layer generally translates a given read/write command into appropriate data packets that may be fed to the packet FIFO circuit 306, and sent through to a framer layer 308. From a receive perspective, the application layer translates received packets from the packet FIFO, and extracts the data within.

The framer layer 308, on the transmit side, employs a framer state machine that converts the packets received from the packet FIFO circuit 306 into Infofield slices and sends the slices to an Infofield slice FIFO 310. On the receive side, the framer layer state machine assembles packets from Infofield slices received from the Infofield slice FIFO 310. The framer layer also checks for overall packet integrity by monitoring statistics in the form of, for example, good and bad packet counters.

Further referring to FIG. 3, coupled to the Infofield slice FIFO 310 is an Infofield layer 312. The Infofield layer takes Infofield slices from the transmit side of the Infofield slice FIFO 310, and loads them into transmit circuitry within an Ethernet transceiver physical layer circuit (PHY) 314. The loaded information may then be encoded and sent over a twisted-pair copper cable at a relatively low data rate that provides a relatively high signal-to-noise ratio (SNR), even when the link may be exposed to alien crosstalk. On a receive side, the Infofield layer 312 extracts payload bits from an Infofield data structure (described below) and sends the resulting Infofield slice to the framer layer 308. To enhance the reliability of the data exchange, the Infofield layer 312 employs a flow control method, described more fully below, that regulates the transmission of Infofield frames such that a new Infofield frame is not sent before a previously sent frame is received through acknowledgement from the remote end of the link.

With continued reference to FIG. 3, a link partner 315 at the remote end of the link includes similar layers to exchange data with the first link partner 302 via Infofield exchange, including a physical layer Ethernet circuit (PHY) 316, an Infofield layer 318, an Infofield slice FIFO 320, a framer layer 322, a packet FIFO 324, and an application layer 326.

FIG. 4 illustrates one embodiment of a 128-bit InfoField frame data structure that is generated by the Infofield layer 312 of FIG. 3. The frames are generally the data carriers at the interface between the framer layer 308 and the Infofield layer 312. Each frame includes a transmit toggle bit field, at 402, and a receive toggle bit field, at 404. The transmit toggle bit, or state, toggles when a new frame is sent. This bit, in conjunction with the receive toggle bit, facilitates Infofield frame flow control such that no new frame will be sent before the previous frame is received and acknowledged. The receive toggle bit is a copy of the transmit toggle bit of a currently received frame. It indicates the acknowledgement to the remote end about what frame has been received.

Further referring to FIG. 4, the Infofield frame data structure further includes a port filed, at 406. The port field represents a destination port identification. This makes it possible to involve multiple applications in a data exchange over a single Infofield channel by having the respective applications open their ports.

With continued reference to FIG. 4, the Infofield frame data structure also includes a payload field, at 408. The payload field may include any data in the form of payload bits. Specific examples may include data representing alien crosstalk information, such as a measured power spectral density, signal-to-noise ratio (SNR) or coefficients representing an impulse response of an alien crosstalk channel, to name but a few. In one embodiment, the payload field includes transition count down bits, similar to the IEEE 10GBASE-T training standard, that may be used for synchronization purposes between transceiver PHY circuits.

FIG. 5 illustrates a flow chart for a method, generally designated 500, of flow control that may be employed by the Infofield layer of FIG. 3. Generally speaking, the Infofield exchange mechanism described herein provides a communication protocol between link partners where the link is not yet operational for Ethernet data transfers. Thus, the signaling environment is not fully characterized, and may be unacceptable noisy for standard Ethernet communication rates. Infofield exchange operates at relatively low data rates, and the flow control mechanism described herein further enhances information exchange reliability through a toggle and acknowledgement scheme. The protocol may be used outside of a normal training information exchange to, for example, send commands or exchange data with a remote partner for alien crosstalk diagnostics, and so forth.

Further referring to FIG. 5, with the training mode of operation halted, or the Ethernet transceiver partners operating in another mode, such as a diagnostic mode of operation, data that is intended for transfer to a remote link partner is packaged and assembled, at 502, into an Infofield frame, such as the frame data structure described above and shown in FIG. 4. The frame toggle bit fields are then properly set, such that the transmit toggle bit reflects an enable state (such as a logic "1"), and the receive toggle bit set to a disable state (such as a logic "0"), at 504. The Infofield frame is then provided to the physical layer circuitry (PHY), where it is transmitted to the remote link partner, at 506. No further Infofield frames are transmitted until an acknowledgement that the transmitted frame was received.

With continued reference to FIG. 5, the transmitted Infofield frame is received by the remote link partner, at 508, and the data or command information extracted from the frame, at 510. In response to receiving the frame, an acknowledgement Infofield frame is assembled at the remote link partner, at 512, with the receive toggle bit enabled, at 514. The acknowledgement frame is then transmitted back across the link to the local link partner, at 516, where it is received, at 518. A subsequent Infofield frame may then be assembled and transmitted by the local link partner.

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A method of operation in an Ethernet transceiver, the Ethernet transceiver operative in accordance with an Ethernet protocol, the method comprising:
    initiating a training mode of operation;
    transmitting data structures comprising Infofield frames to a link partner, each Infofield frame including a payload field to provide data to the link partner;
    controlling a flow of the transmitted Infofield frames such that a new Infofield frame is not transmitted before a previous Infofield frame is received by the link partner; and
    wherein the data comprises alien crosstalk data obtained via measurements made prior to terminating the training mode of operation.

2. The method of claim 1, further comprising:
    confirming receipt of a given Infofield frame via an acknowledgement signal from the link partner.

3. The method of claim 1, wherein each Infofield frame includes:
    a transmit toggle bit; and
    a receive toggle bit.

4. The method of claim 3, wherein the values of the transmit toggle bit and the receive toggle bit indicate an acknowledgement about what Infofield frame has been received by the link partner.

5. The method of claim 1, wherein each Infofield frame include:
    a destination port field to identify an application port.

6. The method of claim 1, further comprising:
    terminating the training mode of operation; and
    following the termination of the training mode of operation, initiating a diagnostic mode of operation, and wherein the transmitting and controlling is carried out during the diagnostic mode of operation.

7. An Ethernet integrated circuit (IC) transceiver chip, the Ethernet transceiver chip operating in accordance with an Ethernet protocol and comprising:
    one or more transmit circuits operable to assemble and transmit a first data structure comprising an Infofield frame to a link partner Ethernet transceiver chip, wherein the Infofield frame includes a transmit toggle bit and a receive toggle bit;
    one or more receive circuits of the Ethernet transceiver chip to receive an acknowledgement signal from the link partner transceiver chip indicating receipt of the first Infofield frame; and
    the one or more transmit circuits operable to transmit a subsequent Infofield frame upon receiving the acknowledgement signal.

8. The Ethernet IC transceiver chip according to claim 7, wherein the acknowledgement signal comprises an acknowledgement Infofield frame sent by the remote link partner.

9. The Ethernet IC transceiver chip according to claim 7, wherein the acknowledgement signal comprises an Infofield frame with the receive toggle bit set to an enable state.

10. The Ethernet IC transceiver chip according to claim 7, wherein the Infofield frame further includes a destination port field.

11. The Ethernet IC transceiver chip according to claim 7, wherein the Infofield frame further includes a payload field.

12. The Ethernet IC transceiver chip according to claim 11, wherein the payload field includes one from the group comprising command information and data information.

13. The Ethernet IC transceiver chip according to claim 12, wherein the data is associated with alien crosstalk information.

14. The Ethernet IC transceiver chip according to claim 7, wherein the Infofield frame is assembled and transmitted during a diagnostic mode of operation.

15. A method for exchanging information between local and remote link partners coupled via a signaling link in an offline state, the method comprising:
    training the local and remote link partners during a training mode of operation;
    initiating a diagnostic mode of operation;
    communicating information from one link partner to another via a communication protocol during the diagnostic mode of operation; and
    wherein communicating information from one link partner to another via the communication protocol comprises:
        transmitting data structures comprising InfoField frames to the link partner, each InfoField frame including a payload field to provide data to the link partner; and
        controlling a flow of the transmitted InfoField frames such that a new InfoField frame is not transmitted before a previous InfoField frame is received by the link partner.

16. The method according to claim 15, further comprising:
    confirming receipt of a given InfoField frame via an acknowledgement signal from the link partner.

17. The method according to claim 15, wherein the information comprises alien crosstalk information.

* * * * *